United States Patent [19]
Csaki

[11] 3,721,142
[45] March 20, 1973

[54] MECHANISM FOR FASTENING A SAW BLADE

[75] Inventor: Joachim Csaki, Stuttgart, Germany

[73] Assignee: Ackermann u-Schmitt KG

[22] Filed: Feb. 22, 1971

[21] Appl. No.: 117,447

[30] Foreign Application Priority Data

Feb. 1, 1971  Germany..................P 20 15 006.5

[52] U.S. Cl ...................83/697, 279/83, 143/68 E, 30/390
[51] Int. Cl..................B27b 19/08, B27b 11/06
[58] Field of Search......143/156 R, 68 R, 68 E, 68 F; 279/83

[56] References Cited

UNITED STATES PATENTS

| | | |
|---|---|---|
| 1,105,456 | 7/1914 | Richards..........................279/83 X |
| 2,073,430 | 3/1937 | Tautz................................279/83 X |
| 2,722,244 | 11/1955 | Schultz............................143/156 R |
| 3,186,726 | 6/1965 | Wilhelm et al................143/156 R X |
| 3,412,767 | 11/1968 | Green.............................143/68 R |
| 1,826,459 | 10/1931 | Council..........................279/83 X |

Primary Examiner—Donald R. Schran
Attorney—Hauke, Gifford & Patalidis

[57] ABSTRACT

A mechanism for mounting the ends of saw blades of different sizes and configurations in a reciprocating chuck of a machine saw. The chuck is formed with an opening in which two flat inner walls intersect at an acute angle to form a corner. The saw blade is placed with one of its sides against one of the inner walls and a corner of the blade opposite the side is placed next to the other inner wall. A set screw then engages the free corner of the blade to press it firmly into the corner formed by the inner walls of the chuck.

6 Claims, 7 Drawing Figures

PATENTED MAR 20 1973 3,721,142

Inventor:
Joachim Csaki
By
Hawke, Gifford & Patalidi

3,721,142

MECHANISM FOR FASTENING A SAW BLADE

BACKGROUND OF THE INVENTION

The present invention relates to means for retaining saw blades in a machine saw, and more particularly to a chuck construction for machine saws and the like which will accommodate saw blades of different sizes and configurations.

Known mechanisms of this type require a special saw blade for each machine because the chuck is designed to accommodate a saw blade with a cross section which corresponds with that of the opening in the chuck. Thus, it is not possible to use the same saw blade in different machines and because the blades break and become dull it is necessary for the dealer to maintain unmanageably large inventories of saw blades of many different types.

The present invention attempts to solve this problem by providing a chuck which is constructed to accommodate saw blades of different sizes and configurations.

DESCRIPTION OF THE DRAWINGS

A more detailed understanding of the present invention will be readily apparent upon reference to the following description of several preferred embodiments thereof. The drawing makes reference to the following description in which like reference characters refer to like parts throughout the several views and in which.

DESCRIPTION OF SEVERAL PREFERRED EMBODIMENTS

Figure 1:
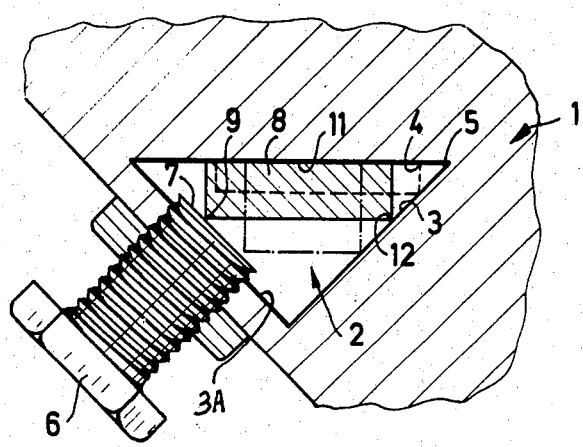
FIG. 1 is a transverse cross-sectional view of a preferred embodiment of the present invention.

Now referring to FIG. 1, a blade fastening chuck 1 is illustrated as having an opening 2. The chuck 1 is not commonly used by itself in the illustrated form but is usually attached to a reference surface of a vertically reciprocating drive means of, for example, a jig saw. The axis of the opening 2 is substantially perpendicular to the reference surface, that is, it is essentially parallel to the direction of movement of the reciprocating chuck 1. The chuck opening 2 is substantially triangular in section as shown and is formed by two flat inner walls 3 and 4 which make an acute angle at a corner edge 5 formed at their juncture and a third wall 3A joined to the walls 2 and 3. A set screw 6, having a flat contact surface 7, extends through the wall 3A. The axis of the set screw 6 is so directed that inward turning of the screw 6 produces an axial force which can be resolved into two components, one of which is perpendicular to the inner wall 4 and the other of which is parallel to the inner wall 4 and in a direction toward the corner 5.

A saw blade 8 is placed within the opening 2 so that the longitudinal axis of the blade is substantially parallel to the longitudinal axis of the opening 2. The saw blade 8 is shown in cross section in FIG. 1. By turning the set screw 6 inwardly, the contact surface 7 will engage the free corner 9 of the saw blade 8 and, because of the above mentioned force components, the saw blade 8 will be urged into the corners and will be firmly fixed with one of its sides 11 parallel to and against the inner wall 4 and a corner edge 12 against the inner wall 3.

It is apparent from FIG. 1 that the chuck 1 can be used to firmly mount saw blades of cross sections and sizes other than that illustrated. For the various types and sizes of saw blades used, a greater or lesser inward turning of the set screw 6 into the opening 2 will be required to urge the saw blade toward the corner 5 and into locking engagement with the walls 3 and 4. The chuck of the present invention then is designed for universal use and is not limited to any special saw blade type.

Figure 2:
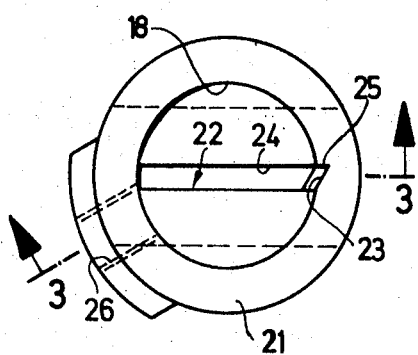
FIG. 2 is a top plan view of another preferred embodiment of the present invention.

FIGS. 2–5 illustrate another preferred embodiment of the present invention comprising a substantially cylindrical chuck 21 having an opening 22 which, as can best be seen in FIG. 2, is of a substantially trapezoidal cross section. As can best be seen in FIG. 4, an enlarged substantially cylindrical opening 18 is provided at one end of the chuck 21 to receive a vertically reciprocating plunger, shown in phantom at 19, of a jig saw or similar machine. The opening 22, as can best be seen in FIG. 2, has two flat inner walls 23 and 24 which form an acute angle at their common corner 25. A saw blade (not shown) will be inserted into the opening 22 from below, as viewed in FIGS. 3 and 4, so that the saw blade lies with one flat side on the inner wall 24 and its corner opposite the flat side engaging the inner wall 23. A threaded hole 26 is formed in the chuck 21 to receive a set screw (not shown) so that the saw blade will be pressed into the acute angular space formed by the inner walls 23 and 24 in the manner described above with respect to FIG. 1.

Figure 3:
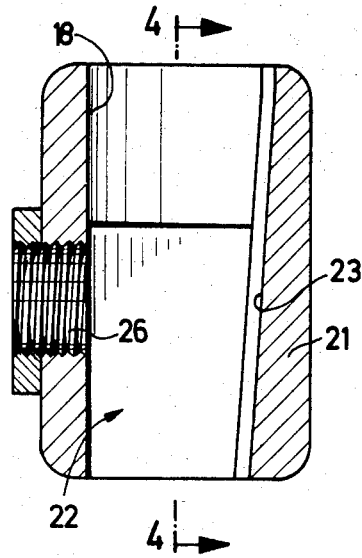
FIG. 3 is a cross-sectional view taken substantially on line 3—3 of FIG. 2.
Figure 4:
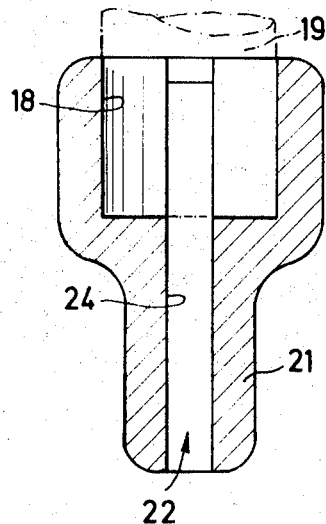
FIG. 4 is a cross-sectional view taken substantially on line 4—4 of FIG. 3.
Figure 5:
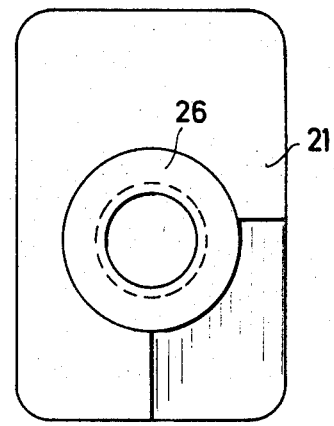
FIG. 5 is a side view as seen from the left side of FIG. 3.

In the embodiment of the invention illustrated in FIGS. 2–5, the inner wall 23 does not run parallel to the axis of the chuck opening 22, but, as shown in FIG. 3, is slanted relative to the said axis so that the width of the slit-like opening 22 narrows toward the bottom. When the saw blade is pressed with its one corner against the inner wall 23 by the set screw turned in from the threaded hole 26, the saw blade will assume the direction of the axis of the chuck 21, which due to the slant of the wall 23 runs at an angle relative to its direction of movement. This blade angle is preferred to achieve proper sawing action.

Figure 6:
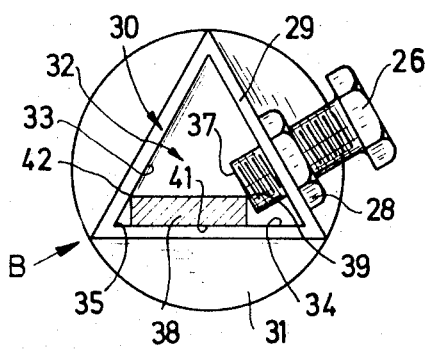
FIG. 6 is a plan view, partially in cross section, of still another preferred embodiment of the present invention.
Figure 7:
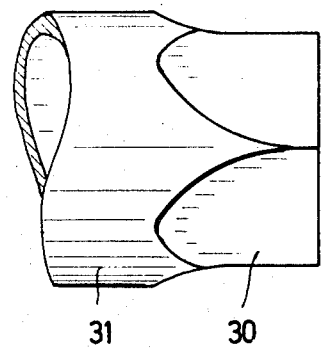
FIG. 7 is a fragmentary side view as seen in the direction of Arrow B of FIG. 6.

In the form of the invention illustrated in FIGS. 6 and 7, a chuck 31 comprises a cylindrical tube, preferably of metal, whose one end, at the right side in FIG. 7, is formed into a three-sided body 30. The body 30 is illustrated in section in FIG. 6. The tubular section of the chuck 31 can be mounted onto a reciprocating plunger (not shown) of a working machine, such as a jig saw, as discussed in relation to the design shown in FIG. 4. A nut 28 is soldered or welded on one wall 29 of the body 30. A set screw 26 is threaded into the nut 28 so that the set screw projects through an opening in the wall 29 and into the triangular inner area of the chuck opening 32. The flat inner walls 33 and 34 of the triangular chuck opening 32 form an acute angle at their common corner 35. A saw blade 38, which is illustrated as having a rectangular cross section, is placed into the chuck opening 32 so that it lies with its flat side 41 on the inner wall 34 and its corner 42 opposite this side on the inner wall 33. By means of the inward turning of the set screw 26 whose contact surface 37 presses against the free corner 39 of the saw blade 38, the sawblade is pressed into the acute angular space formed by the inner walls 33 and 34. Again, it is apparent that the saw blade 38 can have a shape and size different from that illustrated.

It is also apparent that although I have described several embodiments of my invention many changes and modifications can be made therein without departing from the spirit of the present invention.

I claim:

1. In a device for clamping a saw blade end in an opening of a chuck means the improvement comprising: said saw blade end having sides forming a rectangular cross section, said opening having first and second flat inner walls encompassing on their common edge an acute angle, said saw blade end contacting with its one side said first inner wall and being placed with its one edge opposite said side on said second inner wall, a set screw on said chuck means projecting into said opening to engage the other edge of the saw blade and opposite said side, the axis of said set screw extending at an oblique angle with respect to said inner wall so that the screw when tightened against said saw blade edge produces two force components acting on said saw blade end, one of which being perpendicular to said first inner wall and the other of which being parallel to said first inner wall in a direction toward said edge between said first and second inner walls.

2. The device as defined in claim 1 and in which the opening in said chuck means is formed inside a projecting chuck body and the chuck body is mounted onto a reciprocating plunger of a machine.

3. The device as defined in claim 1 and in which the opening in said chuck means comprises a tubular end portion having a three-sided body portion.

4. The device as defined in claim 1 and in which the chuck opening is formed with a trapezoidal cross section.

5. The device as defined in claim 1 and in which the chuck opening has a cross section in the form of a triangle.

6. The device as defined in claim 1 and in which one of said inner walls is inclined and against which the corner of the saw blade is pressed so that the cutting edge of the saw blade runs at an angle inclined relative to its direction of movement.

* * * * *